April 2, 1957  R. W. HUGHES  2,787,411
COMPRESSOR UNLOADING MECHANISM
Filed April 28, 1952  2 Sheets-Sheet 1

Inventor:
Robert W. Hughes.
by
[signature]
Attorney.

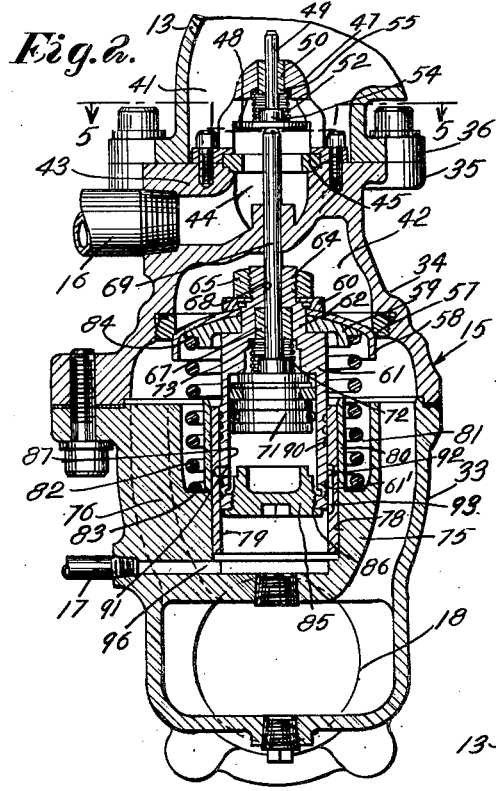
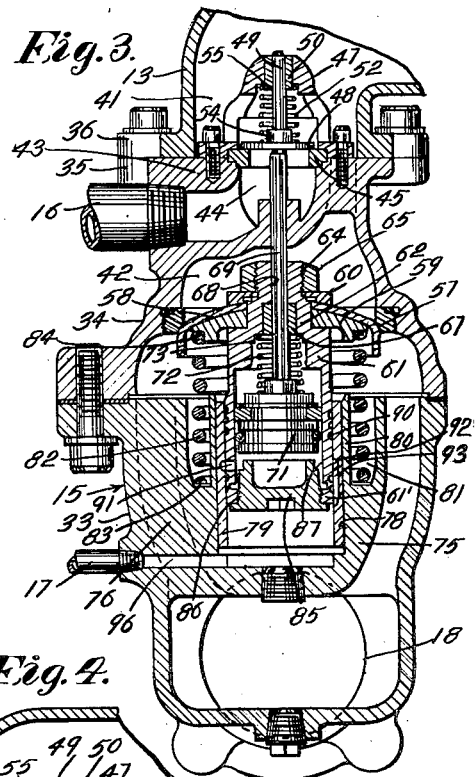
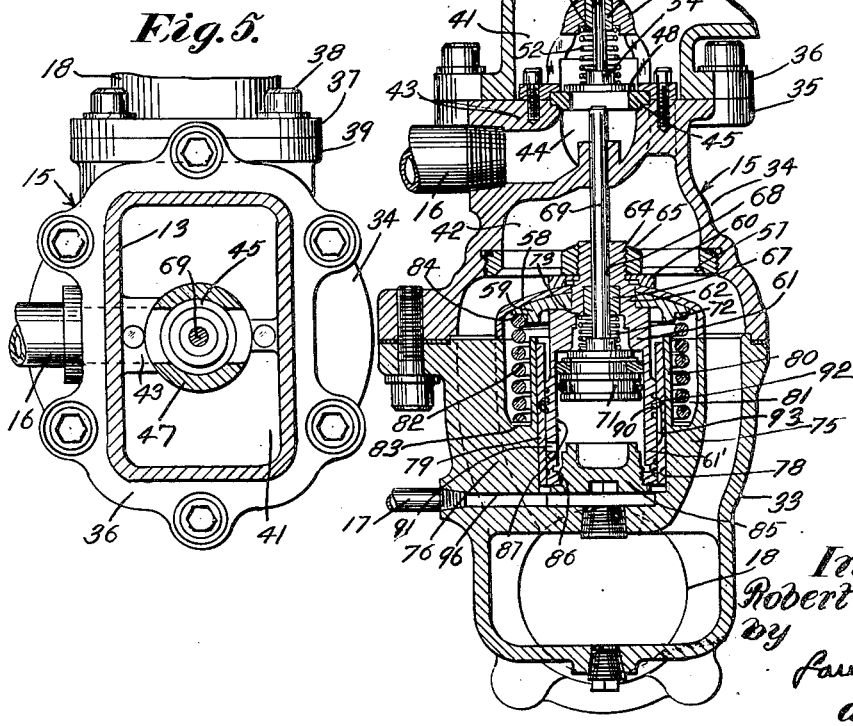
Inventor:
Robert W. Hughes

United States Patent Office 2,787,411
Patented Apr. 2, 1957

2,787,411

COMPRESSOR UNLOADING MECHANISM

Robert W. Hughes, Michigan City, Ind., assignor to Joy Manufacturing Company, Pittsburgh, Pa., a corporation of Pennsylvania Application April 28, 1952, Serial No. 284,840

13 Claims. (Cl. 230—27)

My invention relates to unloading apparatus for compressors, and more particularly, to combined check and relief valve mechanisms for association with the discharge lines of compressors which have intake closure-type unloading means associated with their intakes.

In order that any fluid which may leak into a compressor after the closure of an intake closure-type unloader valve, may not be compressed through a large number of compressions and thereby generate a dangerous degree of heat—possibly sufficient even to "flash" the lubricant in the compressor cylinder or cylinders, it is desirable that there be associated with the discharge of the compressor an apparatus for venting to the atmosphere such fluid as may be forced through the compressor with the intake closure valve in closed position, rather than have the fluid which may leak into the compressor compressed from a partial vacuum sufficiently to unseat the check valve which is desirably arranged between the discharge of the compressor and the receiver or the like. It is desirable that, in an arrangement in which a relief valve and a check valve are associated with the discharge line of a compressor, the check valve shall always close during the unloading operation before the relief valve opens, but that there shall not be any material time interval between these operations. It is further desirable that, on loading, the relief valve be closed before the check valve is opened, both to prevent loss of air from the receiver and to permit pressure in the compressor discharge line to build up relatively gradually from atmospheric to receiver pressure.

It is an object of the present invention to provide an improved compressor unloading apparatus. It is another object of the invention to provide an improved check and relief valve mechanism for association with the discharge line of a compressor which is provided with an intake closure-type unloading valve. It is a further object of the invention to provide an improved unloading system for a compressor, including, at the intake to the compressor an intake closure-type unloader valve, and at the discharge of the compressor a combined check and relief valve mechanism, the several valve elements of such mechanisms controlled by a common pilot valve. Other objects and advantages of the invention will hereinafter appear.

In a preferred embodiment of the invention from its aspect as an associated check valve and relief valve, the check valve and relief valve may desirably be arranged with oppositely facing seats, the relief valve seating in the direction of flow and the check valve seating opposite the direction of flow. The check valve may desirably have associated with it not only resilient means for normally biasing it in a closing direction but also means for moving it positively to closed position if it is open, and holding it in closed position. Desirably the means for maintaining the relief valve closed and for effecting its closure if it is open, may include cylinder and piston mechanism (a first servo-motor) including relatively movable elements to which fluid may be supplied, as from a pilot valve, to effect control of the check valve. Desirably this cylinder and piston mechanism will have associated with the movable element thereof a further element cooperating with said movable element to provide another cylinder and piston couple (a second servomotor). The one of these last two elements which is movable relative to the other may provide the movement for opening the relief valve, and desirably the relative movement between the elements which control the check valve may be utilized for the purpose of controlling the supply of fluid to and the venting of fluid from the elements which form a servomotor for opening the relief valve. Desirably the whole check and relief valve assembly may be formed with all of the principal elements thereof coaxial.

In the accompanying drawings in which one illustrative embodiment of the invention from its various aspects has been shown, Fig. 1 is a somewhat diagrammatic view, with parts broken away, of a two-stage compressor in which the invention is embodied.

Figs. 2, 3 and 4 are enlarged central vertical sections through the improved relief and check valve mechanisms showing the parts in different positions.

Fig. 5 is a generally horizontal section on the planes of the lines 5—5 of Fig. 2.

Figure 1:
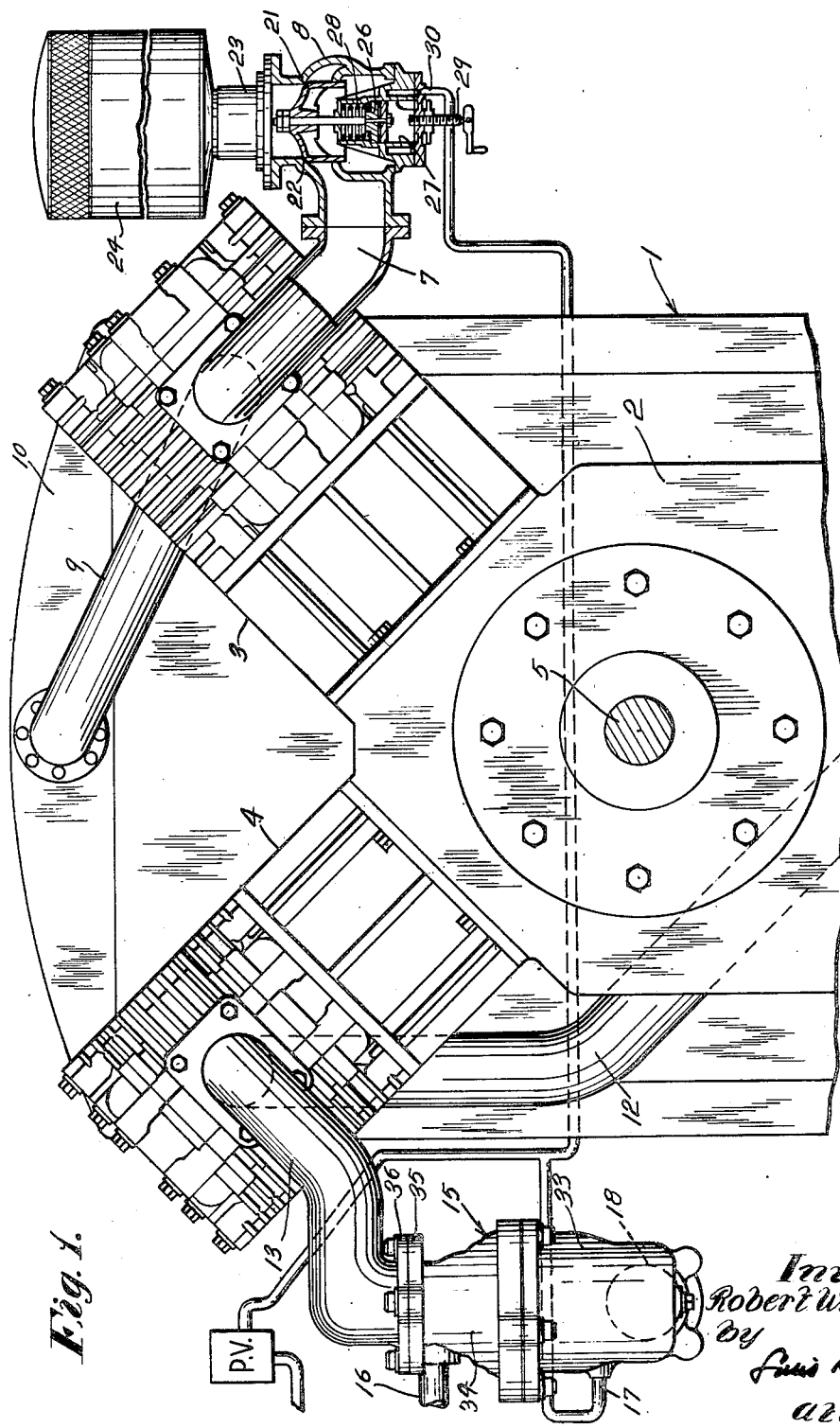

Referring to the drawings, and first to Fig. 1, it will be observed that an air compressor is more or less conventionally shown at 1. It includes a crankcase 2 on which low and high-pressure cylinders 3 and 4 are shown mounted in 90° relation. The compressor has a crankshaft 5 driven in any suitable manner, and effecting reciprocation of low and high pressure pistons (not shown) in the cylinders 3 and 4. The low pressure cylinder 3 has an intake connection 7 with which an intake closure valve mechanism 8 of conventional form is associated. The low-pressure cylinder discharges through a conduit 9 to an intercooler 10, and a conduit 12 conducts air from the intercooler 10 to the high-pressure cylinder 4. The high-pressure cylinder 4 discharges to a discharge conduit 13 which is connected to a combined relief and check valve apparatus 15, which includes, as will be later more fully described, a vent connection 16, a pilot valve-controlled operating fluid supply connection 17, and a connection 18 leading to a receiver or other point of use or storage of compressed air.

As previously stated, the intake closure or intake valve 8 is of conventional form. It includes a valve element 21 engageable with a seat 22 which is shown coaxial with a supply conduit 23 with which an air cleaner 24 is associated. The valve 21 is adapted to be seated by a piston 26 reciprocable in a cylinder bore 27. A spring 28 normally maintains the valve 21 open, and this valve may be closed either manually, as by a hand rotated screw 29, or by the supply of fluid to it through a conduit 30. When a pilot valve P. V., set to effect unloading at a predetermined desired upper pressure limit, as, for example, 100 p. s. i. g., opens in response to increasing compressor discharge pressure, fluid is supplied to act upon the piston 26 and move the valve 21 to the position shown in Fig. 1. When the receiver pressure drops to the desired lower limit as, for example 90 p. s. i. g., the pilot valve P. V. closes off the supply of fluid to the cylinder bore 27 and vents fluid from the latter, and the spring 28 opens the valve 21, and the compressor thereupon commences again to operate loaded.

As previously indicated, when the valve 21 is seated there may be possible some leakage into the intake passage 7, and, accordingly, the air drawn into the low-pressure cylinder 3 will be compressed in the compressor to the value necessary to permit discharge—to receiver pressure, if no relief valve-control discharge to atmosphere were provided. The biggest range of compression would occur in the high-pressure cylinder, and this might be dangerous if provision were not made for effecting the discharge to atmosphere, at substantially atmospheric pressure, of the air which might leak into the compressor during unloaded operation of the latter.

As previously indicated, it is desirable also that provision be made for preventing back flow of fluid from the compressor discharge line or receiver, and that this be operative before the relief connection is opened. Suitable means for accomplishing this and other desired functions previously referred to will now be described with the aid of Figs. 2 to 5.

It may be noted, before describing the structure of the relief and check valve mechanism in detail, that this mechanism, which is generally designated 15, includes a pair of casing elements 33 and 34. The latter is provided with a flange 35 to which there is connected an opposed flange 36 formed on the discharge connection 13, and the casing element 33 has at its lower end the connection 18 with the discharge line leading to a receiver or other point of use or storage, and this connection (as shown in Fig. 5) is also a flange-type connection, and a flange 37 on the discharge connection 18 is suitably bolted as at 38 against a flange 39 on the casing section 33.

As best shown in Fig. 5, the discharge end of the conduit 13 terminates in a relatively large (herein rectangular) opening 41 which communicates freely with a chamber 42, the only obstruction to the communication being a partial one by reason of the presence of the mounting for the relief valve shortly to be described. A projecting fluid conducting conduit element 43 extends partially across the opening 41 and contains a chamber or passage 44 with which the relief conduit 16 communicates. A valve seat member 45 is carried by the element 43 and is held in position by a stop and guide structure 47 for a relief valve 48. The relief valve 48 is provided with a guide stem 49 received in a guide bushing 50 carried at the upper end of the structure 47, and a spring 52 normally maintains the relief valve 48 against the seat member 45 and tends constantly to return it thereto when it is lifted. The stem 49 has an enlarged collar 54 at its base which, with a projecting portion 55 of the guide bushing 50, centers the spring 52. It will be evident that when the relief valve 48 is in the position shown in Fig. 2, a free communication between the discharge conduit 13 and the relief connection 16 is established by way of the passage 44.

The casing element 34 has threadedly or otherwise suitably mounted in it, in coaxial relation with the relief valve, an annular valve seat 57 upon which there is adapted to seat a check valve 58, shown in the form of a cupped disc clamped between a spring seat 59 and a follower 60. The spring seat is supported upon the (as shown) upper end of a hollow, combined cylinder and piston element 61 which has a reduced portion 62 extending through the spring seat 59, the valve 58 and the follower 60, and which has a threaded further-reduced portion 64 with which a nut 65 cooperates to clamp the cylinder and piston member 61, spring seat 59, the valve 58 and the follower 60 together. The reduced portion 62 is bored to receive a guide and sealing bushing 67, and the further reduced portion 64 has a coaxial guide passage 68 extending through it. A push rod 69 is slidably received in the bushing 67 and the bore 68 and at its lower end is connected to a piston element 71 whose upper surface is pressed by a spring 72 which acts between the upper surface of the piston 71 and the oppositely facing surface 73 surrounding the bushing 67, in a direction to move the plunger 69 downwardly from the positions shown in Figs. 2 and 4 to the retracted position shown in Fig. 3. A radially inwardly projecting boss portion 75, shown integral with the housing element 33 and having a substantial flow area past it within the casing element 33, is secured to the wall of the element 33 by a comparatively narrow weblike portion 76. It has a bore 78 in which a bushing 79 is mounted. The upper end of the bore 78 is bounded by a cylindrical sleeve-like portion 80 spaced by an annular groove 81 from the surrounding portion of the boss portion 75, and a spring 82 is mounted in the groove 81 and acts between an annular surface 83 on the boss 75, and a surface 84 on the spring seat 59 to press the check valve 58 towards its seat.

The combined cylinder and piston member 61 includes a head 85 connected as by screw threads 86 to the lower end of a sleeve portion 61', and the member 71 is reciprocable in a bore 87 within the combined cylinder and piston member 61. This combined cylinder and piston member is provided with sealing grooves 90 formed in its outer periphery, and is traversed by a radial passage 91, which is movable into communication with an internal annular passage 92 formed in the bushing 79, and with the groove 92 there communicates a longitudinally extending groove 93 formed in the inner wall of the bushing element 79 so that when the piston and cylinder device 61 moves up far enough fluid may pass through the groove 93, and through the radial passage 91, and act on the bottom of the piston member 71 and move the latter up to effect opening of the relief valve.

Fig. 2 shows the position of the parts during unloaded operation of the compressor. Fluid is being supplied at this time from the compressor discharge pressure responsive pilot valve P. V. through the conduit 17 which communicates through a passage 96 within the chamber forming boss 76 with the bottom of the chamber 78 in which the bushing 79 is mounted. This fluid is acting on the bottom of the piston forming element 85 and maintaining the check valve 58 closed upon its seat 57. Fluid is passing through the groove 93, whose lower end is now uncovered, the circumferential groove 92, and the radial passage 91, into the space below the piston 71, and forcing the latter piston and the push rod 69 upwardly, and thus holding the relief valve 48 open. Accordingly, the check valve 58 is preventing back flow from the connection 18 into the chamber 42, and the discharge conduit 13 is freely connected with the relief connection 16.

Now, let it be supposed that the compressor discharge pressure falls to such a low value that it is desired to effect reloading. Thereupon, fluid supply to the line 17 from the pilot valve will be interrupted, and fluid will be vented from this line. This will permit the spring 72 to move the piston 71 and the push rod 69 downward, and allow the relief valve 48 to seat upon its annular seat-providing ring 45. For the check valve 58 to be opened, it will be necessary for a sufficient pressure to build up in the chamber 42 to unseat the check valve against the pressure of the spring 82, even though the pressure in the space beneath the combined cylinder and piston member 61 may be vented, as would be the case before the closure of the relief valve could take place. Now it will be evident that in the position of the parts shown in Fig. 3, the relief valve 48 is closed, but the check valve 58 is still closed, and the position of the parts shown in Fig. 4 will not be attained until compressor discharge pressure builds up from atmospheric sufficiently to force the check valve 58 from its seat, and when this check valve is unseated, it will be moved to the position shown in Fig. 4 and remain there until the pilot valve again supplies fluid to effect unloading.

It will be observed that, upon the occurrence of unloading, the check valve 58 closes before the relief valve 48 opens, and therefore loss of air from the receiver or compressor discharge line is prevented. On the other hand, during loading, the relief valve 48 is closed substantially before the check valve 58 is opened, thus, again preventing a loss of air from the receiver and permitting the load to be reapplied to the compressor less sharply.

From the foregoing it will be evident that a very desirable arrangement of relief and discharge check valves has been provided, that only after the check valve is held closed will the relief valve be opened (so that waste of compressed air will be avoided) and that upon reloading, the relief valve will close first, and the check valve will not open until the compressor, which becomes reloaded with only atmospheric pressure in its discharge line, has built up discharge line pressure to the essential level. The check and relief valve structure is rugged, durable, simple and effective to produce controls in best sequence, and the whole unloading system will provide a very effective unloading without waste of air or danger of excessive temperatures during unloaded operation.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim is:

1. In combination, in an unloading means for a compressor which has associated with it an intake closure type unloader valve, a relief valve, a vent connection having a seat at its end adjacent said relief valve, said relief valve arranged to cooperate with said seat and having means associated with it for yieldingly pressing it toward closed position, a check valve, a conduit leading from said check valve to a receiver or the like, said check valve having a seat with which it cooperates and on which it seats against the flow of air from the compressor to the receiver or the like, resilient means biasing said check valve towards its seat but inadequate to maintain it seated, when the compressor is operating loaded, against compressor discharge pressure, a fluid actuated servo-motor for seating said check valve, another fluid actuated servo-motor for unseating said relief valve, means for supplying fluid to said first mentioned servo-motor, and means controlled by relative movement between the elements of said first mentioned servo-motor for controlling fluid supply to said second servo-motor.

2. The combination as defined in claim 1, in which said servo-motors are coaxial.

3. The combination as defined in claim 2, in which said relief valve and said check valve are coaxial with said servo-motors.

4. The combination as defined in claim 1, in which said servo-motors have a common element which forms a piston for one of the same and a cylinder for the other.

5. The combination as defined in claim 4, in which said means controlled by relative movement between the elements of said first mentioned servo-motor for controlling said fluid supply to said second servo-motor includes passages in said common element and in the element of said first servo-motor which cooperates with said common element.

6. In combination, in a combined check and relief valve assembly for the discharge line of a compressor, a vent connection, a receiver connection, a ported relief valve seat through the porting in which communication may be had between the discharge line of the compressor and said vent connection, a ported check valve seat through which communication may be had between the discharge line of the compressor and said receiver connection, a check valve associated with said check valve seat, a relief valve associated with said relief valve seat, means yieldingly pressing said check valve towards its seat, means including a thrust element transmitting a thrust to said check valve moving said check valve to its seat and holding it seated, means associated with said relief valve for opening the latter including an element movable to effect its unseating, and a lost motion connection between said elements precluding opening of said relief valve until said check valve is seated.

7. In combination, in a combined check and relief valve assembly for the discharge line of a compressor, a relief valve seat, a check valve seat, a check valve associated with said check valve seat, a relief valve associated with said relief valve seat, means yieldingly pressing said check valve towards its seat, means including a thrust element movable with said check valve arranged to move said check valve to its seat and hold it seated, means for opening said relief valve including an element movable to effect its unseating, and a lost motion connection between said elements, said lost motion connection having associated with it means for extending it and permitting collapse thereof.

8. In combination, in a combined check and relief valve assembly for the discharge line of a compressor, a relief valve seat, a check valve seat, a check valve associated with said check valve seat, a relief valve associated with said relief valve seat, means for yieldingly pressing said check valve towards its seat, means including a thrust element movable with said check valve arranged to move said check valve to its seat and hold it seated, means for opening said relief valve including an element movable to effect its unseating, and means providing a lost motion connection between said elements, said lost motion connection having associated with it means for extending and permitting collapse thereof, said lost motion connection having a range of free movement insufficient to permit opening of the relief valve in the wide open position of the check valve.

9. In combination, a compressor having an intake and a discharge line, a fluid pressure closable total intake closure valve controlling said intake, a discharge check valve and a relief valve associated with said discharge line, the latter nearer, in terms of discharge air flow, the compressor than the former, fluid pressure operable means for opening said relief valve and closing said check valve, a compressor discharge pressure responsive pilot valve controlling the supply of compressor discharge pressure to effect closing of said first valve, closing of said check valve and opening of said relief valve, and means including a fluid pressure flow control governed by movement of said check valve closing means for delaying access of compressor discharge pressure to effect opening of said relief valve until said check valve is closed.

10. In combination, a compressor having an intake and a discharge line, a fluid pressure closable total intake closure valve controlling said intake, a discharge check valve and a relief valve associated with said discharge line, the latter nearer, in terms of discharge air flow, the compressor than the former, fluid pressure operable means for opening said relief valve and closing said check valve, a compressor discharge pressure responsive pilot valve controlling the supply of compressor discharge pressure to effect closing of said first valve, closing of said check valve and opening of said relief valve, and means including a fluid pressure flow control governed by movement of said check valve closing means for delaying access of compressor discharge pressure to effect opening of said relief valve until said check valve is closed but permitting venting of said fluid pressure operable means for opening said relief valve while said check valve remains closed.

11. In combination, in an unloading means for a compressor which has associated with it an intake closure type unloader valve, a relief valve, a vent connection having a seat at its end adjacent said relief valve, said relief valve arranged to cooperate with said seat and having means associated with it for yieldingly pressing it toward closed position, a check valve, a conduit leading from said check valve to a receiver or the like, said check valve having a seat with which it cooperates and on which it seats against the flow of air from the compressor to the receiver or the like, means biasing said check valve towards its seat but inadequate to maintain it seated, when the compressor is operating loaded, against compressor discharge pressure, a fluid actuated servo-motor for seating said check valve, another fluid actuated servo-motor for unseating said relief valve, means for supplying fluid to said first mentioned servo-motor, and means controlled by said first mentioned servo-motor for controlling fluid supply to said second servo-motor.

12. In combination, in a combined check and relief valve assembly for the discharge line of a compressor, a relief valve seat, a check valve seat, a check valve associated with said check valve seat, a relief valve associated with said relief valve seat, means for yieldingly pressing said check valve towards its seat, means including a thrust element movable with said check valve for moving said check valve to its seat and holding it seated, means for opening said relief valve including an element movable to effect its unseating and means providing a lost motion connection between said elements having fluid operable means for taking up the lost motion thereof.

13. In combination, a compressor having an intake and a discharge line, a fluid pressure closable total intake closure valve controlling said intake, a discharge check valve and a relief valve associated with said discharge line, the latter nearer, in terms of discharge air flow, the compressor than the former, fluid pressure operable means for opening said relief valve and closing said check valve, a compressor discharge pressure responsive pilot valve controlling the supply of compressor discharge pressure to effect closing of said first valve, closing of said check valve and opening of said relief valve, and means governed by movement of said check valve closing means for delaying opening of said relief valve until said check valve is closed.

References Cited in the file of this patent
UNITED STATES PATENTS

| | | |
|---|---|---|
| 686,778 | Steedman | Nov. 19, 1901 |
| 686,779 | Steedman | Nov. 19, 1901 |
| 1,510,903 | Riesner | Oct. 7, 1924 |
| 1,557,426 | Conrader | Oct. 13, 1925 |
| 1,616,992 | Ruckstuhl | Feb. 8, 1927 |
| 2,041,717 | Lamberton | May 26, 1936 |
| 2,137,752 | Ferguson | Nov. 22, 1938 |
| 2,221,789 | Ferguson | Nov. 19, 1940 |